United States Patent [19]

Baubles

[11] Patent Number: 4,488,844

[45] Date of Patent: Dec. 18, 1984

[54] FLOATING FASTENER RETAINER ASSEMBLY WITH REMOVABLE FASTENERS

[75] Inventor: Richard C. Baubles, Maplewood, N.J.

[73] Assignee: Jacobson Mfg. Co., Inc., Kenilworth, N.J.

[21] Appl. No.: 386,102

[22] Filed: Jun. 7, 1982

[51] Int. Cl.³ .............................................. F16B 39/00
[52] U.S. Cl. ..................................... 411/85; 411/103; 411/107; 411/121; 411/177; 52/710
[58] Field of Search .................... 411/83–88, 411/173–177, 90, 92, 95, 98, 101, 103, 107, 121, 122, 427, 512, 532, 340; 52/710

[56] References Cited

U.S. PATENT DOCUMENTS

| | | |
|---|---|---|
| 2,144,350 | 1/1939 | Swanstrom . |
| 2,237,595 | 4/1941 | Dyer . |
| 2,249,923 | 7/1941 | Whitcombe . |
| 2,333,386 | 11/1943 | Murphy ............................... 411/84 |
| 2,403,247 | 7/1946 | Sullivan ............................. 411/340 |
| 2,413,669 | 12/1946 | Whitcombe . |
| 2,421,278 | 5/1947 | Luce . |
| 2,429,833 | 10/1947 | Luce . |
| 2,438,044 | 3/1948 | Freesz . |
| 2,455,145 | 11/1948 | Swanstrom . |
| 2,575,594 | 11/1951 | Reiner . |
| 2,705,991 | 4/1955 | Reiner . |
| 2,879,820 | 3/1959 | Trzcinski . |
| 2,968,329 | 1/1961 | Reiner . |
| 3,020,946 | 2/1962 | Mills . |
| 3,456,706 | 7/1969 | Ollis, Jr. . |
| 3,493,025 | 2/1970 | LaLonde et al. . |
| 4,315,393 | 2/1982 | Schack et al. ....................... 411/908 |

Primary Examiner—Gary L. Smith
Assistant Examiner—Neill Wilson
Attorney, Agent, or Firm—Richard L. Cannaday; William J. Ungvarsky; Frank J. DeRosa

[57] ABSTRACT

Disclosed are fastener assemblies in which the fastener is captivated in a channel member and is removable through the opening between inturned flange edges of the channel member. Embodiments of a nut retainer assembly and a bolt retainer assembly are disclosed as is an embodiment of a complementary clamping system utilizing a nut retainer assembly and a bolt retainer assembly. In order to facilitate insertion of a fastener through the opening between inturned flange edges of the channel member, at least one of the flats of the base of the fastener includes an inclined portion. Further, in order to facilitate removal of a captivated fastener, at least one of the flats of the base of the fastener includes a cut-out or recessed portion which with the inturned flange edge forms a slot suitable for receiving the tip of a screwdriver. Pivoting the screwdriver in cooperation with the recessed portion of the flat causes outward, elastic flexing of a flange portion to enable the base of the fastener to be moved through the opening between the inturned flange edges, and thus removed from captivation in the channel member. A fastener base is inserted into the channel member through the opening by positioning the fastener base with one flat in the channel member and with the inclined portion of the other flat resting on an inturned flange edge. Force is applied to the fastener base which in cooperation with the inclined flat portion flexes elastically the flange portion of the channel member outwardly to enable the fastener base to be moved through the opening.

34 Claims, 13 Drawing Figures

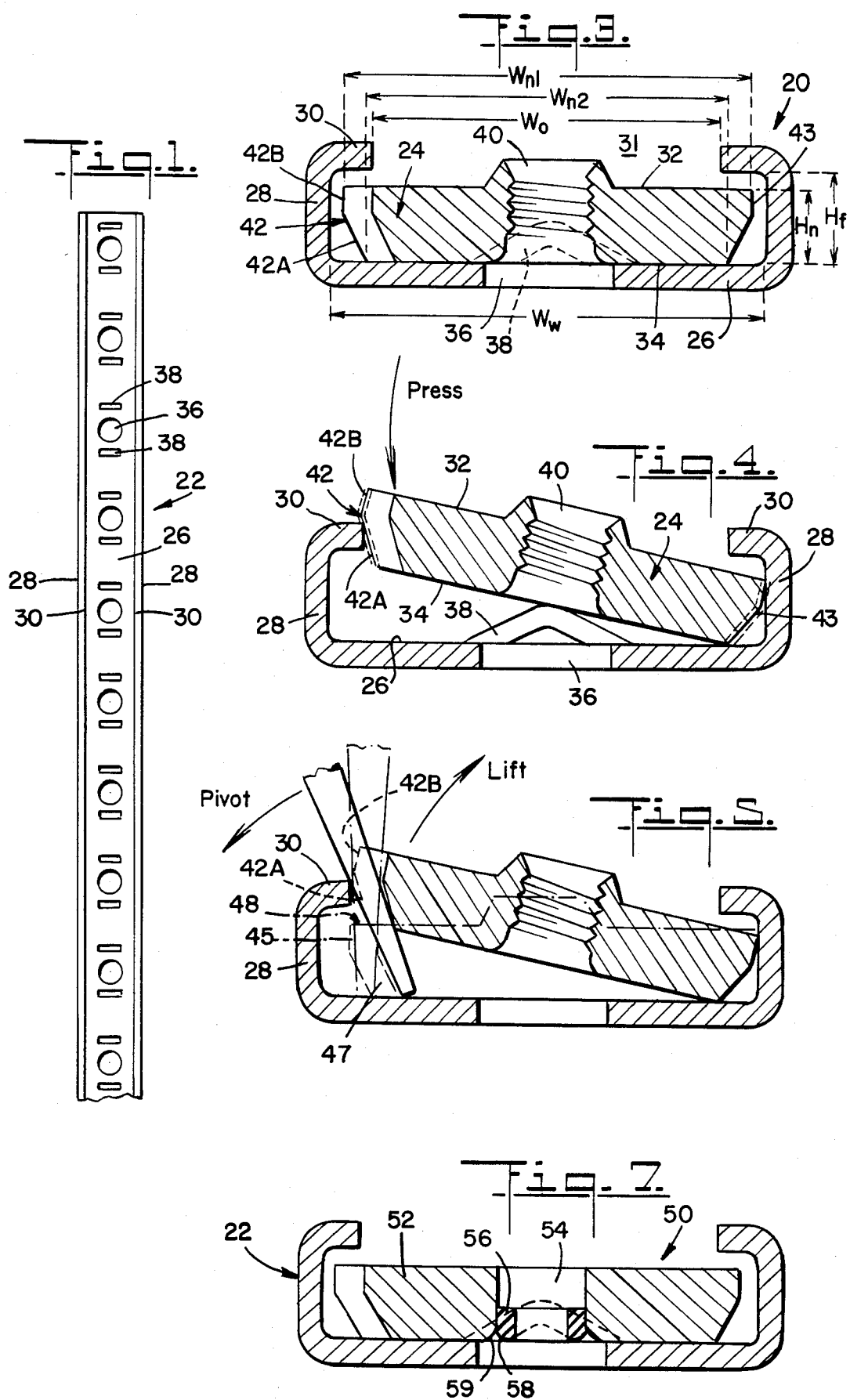

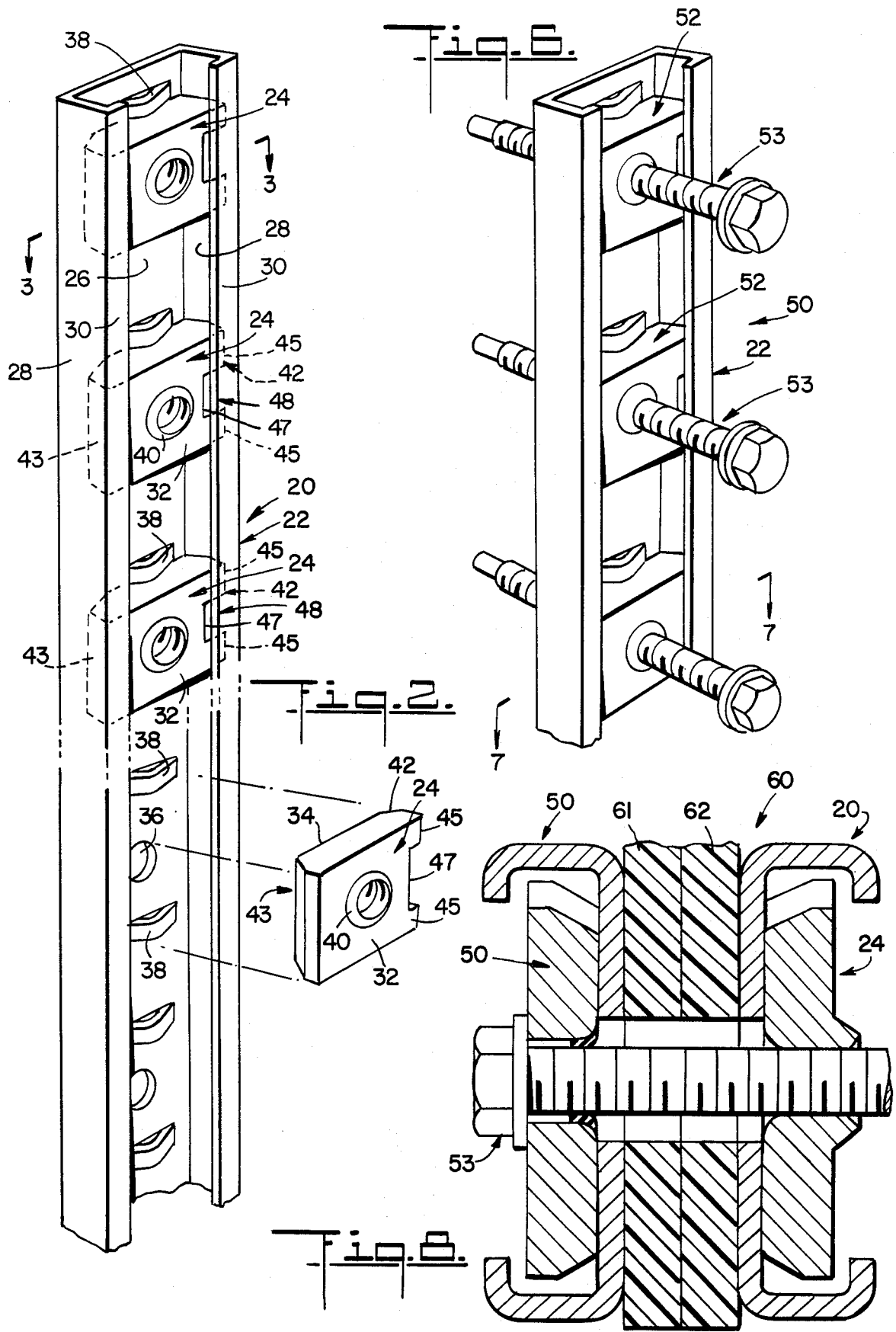

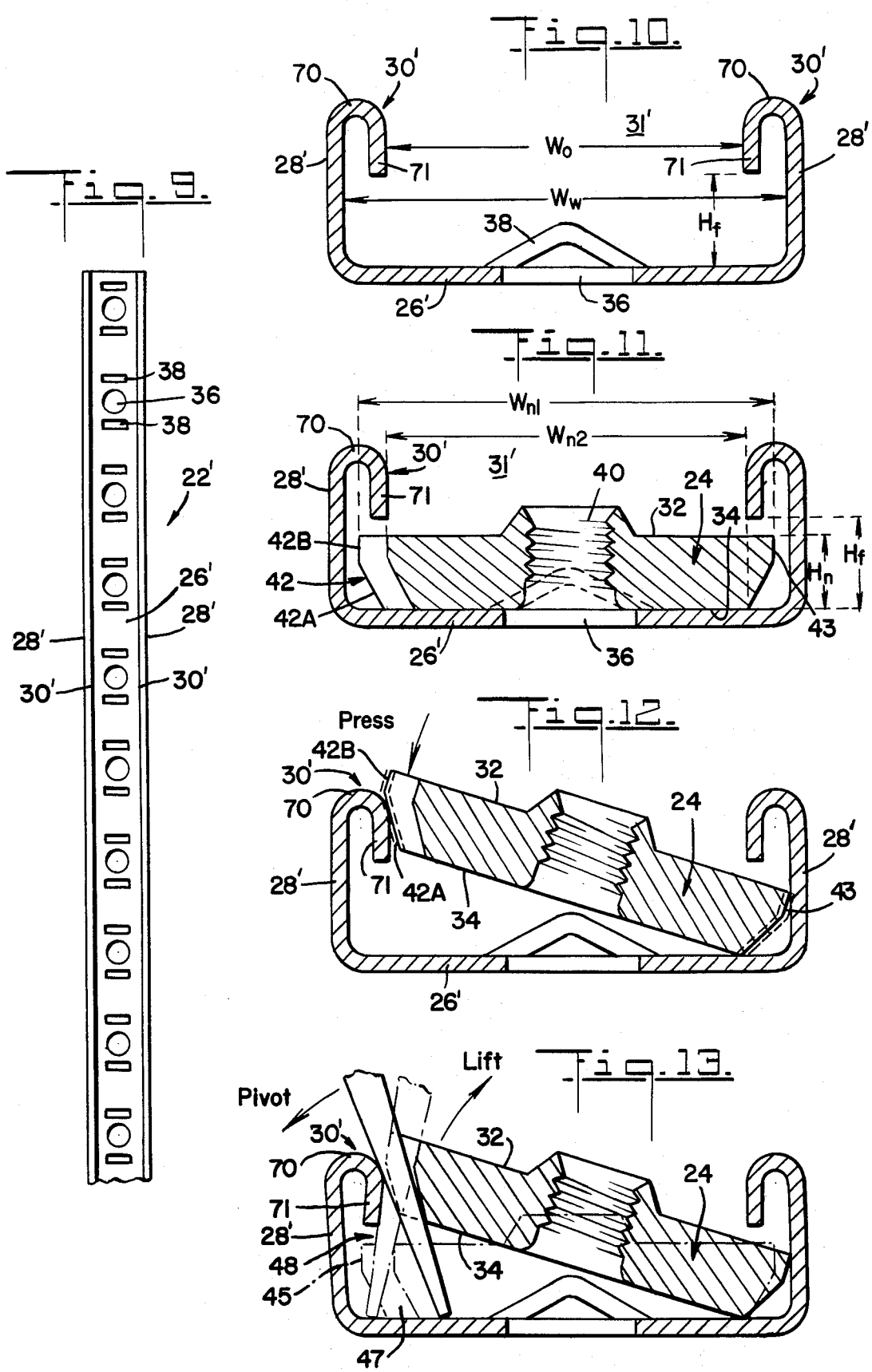

FLOATING FASTENER RETAINER ASSEMBLY WITH REMOVABLE FASTENERS

BACKGROUND OF THE INVENTION

The present invention relates to a retainer assembly for at least one fastener, for example a nut or a bolt, in which the fastener is floatingly retained within a channel member, and to a clamping system which includes complementary fastener retainer assemblies.

Floating nut and bolt retainers in which a nut or bolt is retained or "captivated" with one or more directions of limited movement in a channel member are known in the art.

Retainers in which the nut or bolt is self-wrenching and retained with limited movement are particularly useful in "blind fastening" operations and have been used extensively in aircraft construction. Such retainers are also quite useful in operations where, though both complementary fastener parts are accessible, it is inconvenient or impractical for a worker to use both hands to engage the complementary fasteners. This may be caused by poor accessibility or a difficulty in being able to use both hands to work both complementary fasteners, as for example where the structure being fastened must be manipulated or held in position.

One reason for allowing limited movement of a retained nut for example is to facilitate alignment of the nut with the bolt being threaded to it so as to reduce substantially the frequency of cross-threading. Also, allowing a limited movement of the nut substantially reduces galling and coldwelded seizures of the bolt to the nut.

A typical nut retainer assembly, or simply a nut retainer, is disclosed in U.S. Pat. No. 2,144,350 issued Jan. 17, 1939. The channel member of that retainer includes a web portion and spaced flange portions extending at right angles from the same side of the web portion. The edge of each flange portion is inturned towards the opposite flange portion. The resulting structure defines generally a C-shaped channel member. One or more holes are provided in the web portion and one or more corresponding nuts are disposed in the channel member, each with its bore generally registered with a respective hole in the web portion. In order to retain a nut once it has been inserted into the channel member, the distance between the inturned flange edges is less than the distance between flats of the nut; the width of the web portion is only slightly greater than the distance between flats of the nut; and the height of the flange portions, i.e., the distance from the web portion to the inturned flange edges, is slightly greater than the height of the nut. The inturned flange edges should overlap the nut by a sufficient distance to provide a desired level of resistance to "push-out" force, i.e., force applied to the nut tending to push it out of captivation through the opening between the inturned flange edges. The nuts are inserted into the channel member through an end thereof. In the apparatus of U.S. Pat. No. 2,144,350, once a nut is positioned in the channel member over a hole in the web portion its longitudinal movement is limited by bending or crimping the inturned flange edges adjacent the nut. Lances or tabs in the web portion, the flange portions or the inturned flange edges can also be used to limit longitudinal movement of the nut.

In a nut retainer of the kind described in U.S. Pat. No. 2,144,350, the movement of the nut relative to the channel member is limited in three directions, i.e., in the direction of the longitudinal extent of the web portion by the crimping, in the direction of the width of the web portion by the relative dimensions of the web portion and the nut, and in the direction of the height of the flange portions by the relative heights of the flange portions and the nut. In addition, the thickness of the flange portions is selected to resist excessive flexing so as to permit only limited rotation between the nut and the web portion, thereby providing for self-wrenching of the nut.

However, in a nut retainer of the kind described, it is not possible to insert the nut into or remove the nut from the channel member through the space between the inturned flange edges without permanent or plastic deformation of the channel member, the use of special tools or the application of very high forces. Thus, as indicated above, the nut is inserted from an end of the channel member and also removed in the same manner, noting that removal, if at all possible, is hindered by the presence of the crimping and other captivated nuts.

Cross-threading and galling leading to seizure of a nut and bolt renders them unusable. When a seizure occurs, the bolt must be separated from the nut by cutting or shearing it, for example by applying additional torque to the bolt, thereby leaving the nut with a part of the bolt threaded to it. When it is necessary to replace a nut in nut retainers of the type described above, the entire retainer assembly has to be replaced since a captivated nut cannot easily be removed and replaced, and that replacement is costly and time consuming.

There is therefore a need for a retainer having floating fasteners in which a captivated fastener can be replaced without replacing the entire retainer assembly.

It is known, however, to removably insert a nut into a C-shaped channel member through the opening between the inturned flange edges using a snapped-in cap member (U.S. Pat. No. 2,575,594 issued Nov. 20, 1951) or a housing having a tab which snaps into engagement with one of the flange edges (U.S. Pat. No. 2,438,044 issued Mar. 16, 1948). However, the additional structure in the form of a cap or housing adds to the material cost and labor cost for manufacturing and assembling the retainer. Additionally, due to the need for "snap action", the cap or housing is typically fabricated of sheet material and may not possess a high resistance to "push-out" force.

Another nut retainer in which the nut can be inserted through the opening between inturned flange edges of a C-shaped channel member is disclosed in U.S. Pat. No. 3,493,025 issued Feb. 3, 1970. The nut and the inturned flange edges include cooperating structure for supporting the nut from the inturned flange edges spaced from the web portion of the channel member. The nut is inserted through the opening between the inturned flange edges and indexed by 90° to engage the structure for supporting the nut. The nut receives a bolt through the opening between the inturned flange edges rather than through an opening in the web portion. As a result, the web portion is not used as a pressure distributing surface. The cooperating supporting structure of the nut and inturned flange edges frictionally engages the nut so as to inhibit movement of the nut. Thus, the nut is not floating. Also, the additional cooperating structure for supporting the nut adds to the material and labor cost for manufacturing and assembling the nut retainer.

Thus, while it may be possible to remove an unusable nut from the nut retainers of the three patents described above through the opening between the inturned flange edges, those nut retainers suffer from the deficiencies indicated.

OJBECTS AND SUMMARY OF THE INVENTION

It is an object of the present invention to improve retainer assemblies of the type including a channel member having flange portions in which at least one fastener is floatingly retained.

It is another object of the present invention to provide a retainer assembly of said type in which a fastener can be inserted into and/or removed from the channel member quickly and easily without the need for special tools.

It is still another object of the present invention to provide a retainer assembly of said type in which the assembly does not have to be replaced in order to replace a retained fastener.

It is also an object of the present invention to provide a fastener assembly of said type in which a fastener can be inserted into and/or removed from the channel member of the assembly through the opening between edges of the flange portions of the channel member.

It is a further object of the present invention to provide a clamping system of complementary retainer assemblies of said type.

It is another object of the present invention to provide a clamping system of complementary retainer assemblies of said type in which a fastener of either or both assemblies can be inserted into and/or removed from the channel member quickly and easily without the need for special tools.

It is also an object of the present invention to provide an improved fastener which can be inserted into and/or removed from a channel member through the opening between edges of the channel flange portions easily, quickly and without the need for special tools.

The above and other objects are achieved in accordance with the invention by providing a fastener, and a fastener assembly which includes the fastener, having means or configuration associated with the fastener for facilitating insertion of the fastener into and means or configuration associated with the fastener for facilitating removal of the fastener from a channel member through the opening between the flange portions of the channel member. The fastener is floatingly retained or captivated, or adapted so to be, in the channel member.

The fastener includes opposed spaced apart faces defining a base with which said configuration for facilitating insertion and removal are associated. The fastener base, which may for example be a nut, a retainer for holding a bolt, or the head of a bolt, is further defined by a pair of opposed side surfaces extending between opposed faces of the fastener base. The side surfaces of a nut, for example, are commonly referred to as flats and may be characterized by different surface configurations.

According to a disclosed embodiment of the inventive fastener, the configuration for facilitating insertion comprises an inclination of at least a portion of at least one of the side surfaces at an obtuse angle with the face of the fastener base which faces the web portion of the channel member when the base is disposed in the channel member. The inclination may be formed by one or more planar and/or curved portions of the at least one side surface. The inclination of the at least one side surface in cooperation with dimensions of the base and the channel member and the rigidity of the flange portions of the channel member enables the base of the fastener to be inserted into the channel member through the opening between the flange portions upon a slight elastic flex of at least one of the flange portions of channel member.

Slight elastic flexing of at least one of the flange portions in cooperation with relative dimensions of the channel member and fastener base enables a fastener base to be removed from the channel member through the opening. The configuration for facilitating removal enables the fastener base to be pivoted, for example, by the tip of a lever-like object while at least one of the flange portions is being flexed elastically.

In the disclosed embodiments, the channel member has a web portion and two spaced flange portions extending from a same side of the web portion, each of the flange portions including an edge turned in towards the other flange portion, the inturned flange edges being spaced apart to define the opening referred to above into the channel member.

The channel member and the fastener base are configured and sized so that the fastener base when disposed in the channel member between the web portions and the inturned flanged edges of the channel member is captivated therein while having limited movement relative to the channel member.

The dimensions of the fastener base and the channel member are selected so that the fastener base can be inserted into the channel member with one side surface disposed between the web portion and an inturned flange edge and with the inclined portion of the opposing side surface resting on the opposed inturned flange edge. Since the base side surface resting on the flange edge is inclined, it acts as a camming surface to flex elastically the flange portion of the channel member upon the application of a relatively small predetermined force to the exposed face of the fastener base. A range or "envelope" of dimensions is selected to insure cooperation of the fastener base and the channel member to achieve the foregoing.

The inclined portion of the side surface of the fastener base is preferably planar and intersects the face of the base facing the web portion at the obtuse angle. Additionally, the side surface having the inclined portion further preferably includes a planar portion intersecting the other face of the base at approximately a right angle.

According to a disclosed embodiment, the configuration for facilitating removal comprises a cut-out or recessed portion in at least one of the base side surfaces. The depth and the extent of the recessed portion cooperate with an inturned flange edge to define a slot when the base is disposed in the channel member. A flat faced tool such as a screwdriver can be inserted into the slot and pivoted to flex elastically at least one of the flange portions of the channel member and at the same time pivot the fastener base and move it through the now enlarged opening. Preferably, the recessed portion is centrally disposed in the side surface, which surface includes a projecting portion on each side of the recessed portion. The surface of the recess preferably includes an inclined portion formed by one or more planar and/or curved portions, similar to the inclined portion of the base side surface. However, the recess surface may also be a "straight" flat intersecting both base faces at approximately a right angle.

According to the disclosed embodiments, the fastener can be a nut captivated in the channel member with limited relative movement therebetween and with the bore of the nut in general registration with a hole in the channel member. The fastener can also comprise a retainer having means associated therewith for frictionally retaining the shank of a bolt in the bore of the retainer. The retainer is captivated in the channel member with limited relative movement therebetween and with the bore of the retainer in general registration with a hole in the channel member. The frictionally-engaged bolt extends through the hole in the channel member and has limited movement relative to the channel member by virtue of the limited movement of the retainer. The fastener base can also comprise the head of a bolt which is captivated as described above, with the shank of the bolt extending through a hole in the channel member.

A nut retainer assembly according to the invention can be used alone in a blind fastening or other application to floatingly retain the nut. A bolt can be inserted through the object to be fastened from the exposed side thereof and received in the captivated nut.

A bolt retainer assembly according to the invention can be used alone in a blind fastening or other application to floatingly retain a bolt. The shank of the bolt extends from an object to be fastened and is accessible for securing a nut thereto.

Further in accordance with the invention, a nut retainer assembly and a complementary bolt retainer assembly can be used together as a clamping system.

The above and other objects, features, aspects and advantages of the invention will be more apparent from the following description of the preferred embodiments of the invention taken in conjunction with the accompanying drawings and appended claims.

BRIEF DESCRIPTION OF THE DRAWINGS

The present invention is illustrated by way of example and not limitation in the figures of the accompanying drawings in which like references indicate similar parts, and in which:

FIG. 1 is a top view of a channel member of a floating nut retainer assembly or a floating bolt retainer assembly according to the invention;

FIG. 2 is a partially exploded, front perspective view of a portion of a nut retainer assembly according to the invention;

FIG. 3 is a cross-sectional view of the nut retainer assembly of FIG. 2 taken along line 3—3 therein;

FIG. 4 is a cross-sectional view similar to that of FIG. 3 depicting insertion of a nut into the channel member of the nut retainer assembly of FIG. 2;

FIG. 5 is a sectional view similar to that of FIG. 3 depicting removal of a nut from the channel member of the nut retainer assembly of FIG. 2;

FIG. 6 is a perspective view of a portion of a bolt retainer assembly according to the invention;

FIG. 7 is a cross-sectional view of the bolt retainer of FIG. 6 taken along line 7—7 therein with the bolt removed;

FIG. 8 is a cross-sectional view taken transversely through complimentary nut and bolt retainers according to the invention showing the complimentary retainers clamping two objects together;

FIG. 9 is a top view of another embodiment of a channel member of a floating nut retainer assembly or a floating bolt retainer assembly according to the invention;

FIG. 10 is a cross-sectional view of the channel member of FIG. 9 taken along line 10—10 therein;

FIG. 11 is a cross-sectional view of a nut retainer assembly which includes the nut of FIGS. 1-5 and the channel member of FIG. 9;

FIG. 12 is a cross-sectional view similar to that of FIG. 4 depicting insertion of a nut into the channel member of the nut retainer assembly of FIG. 11; and FIG. 13 is a cross-sectional view similar to that of FIG. 5 depicting removal of a nut from the channel member of the nut retainer assembly of FIG. 11.

DESCRIPTION OF THE PREFERRED EMBODIMENTS

The embodiments of fastener retainer assemblies selected for the purpose of illustrating the invention include a nut retainer assembly and a bolt retainer assembly, or simply a nut retainer and a bolt retainer. It is within the contemplation of the invention that the illustrated nut and bolt retainers be used independently of each other or together as a complementary, retained fastener, clamping system.

An embodiment of a floating nut retainer according to the invention is illustrated in FIG. 2 while an embodiment of a floating bolt retainer according to the invention is illustrated in FIG. 6. It should be understood that while retainers including a plurality of nuts and bolts are illustrated, the respective retainer may include only a single nut or bolt. Use of the floating nut retainer of FIG. 2 and the floating bolt retainer of FIG. 6 as a complementary clamping system is illustrated in FIG. 8.

Referring now to FIGS. 1-3, the floating nut retainer, generally designated 20, includes a channel member 22 and a plurality of nuts 24 floatingly and removably retained in the channel member. The channel member 22 includes a web portion 25 and two spaced flange portions 28 extending from a given side of the web portion 26. Each of the flange portions 28 includes an edge portion 30 turned in towards the opposite flange portion. While the flange portions 28 are illustrated as extending from the web portion at right angles and the inturned flange edges 30 are illustrated as extending from the flange portions at right angles, it is within the contemplation of the invention that the flange portions and the inturned flange edges can extend at angles other than right angles.

As shown in FIG. 3, the inturned flange edges 30 are spaced apart to define an opening 31 having a width $W_o$; the web portion between the flange portions has a width designated $W_w$; the nuts 24 have a width $W_{n1}$ between side surfaces, i.e., flats, adjacent the reverse face 32 of the nut and $W_{n2}$ between flats adjacent the obverse face 34 of the nut; the nuts 24 have a height $H_n$ and the inturned flange edges 30 define a flange height $H_f$ from the top of the web portion to the bottom of the inturned flange edges. The height $H_n$ of the nuts is less than the height $H_f$ of the flange portion and the width $W_{n1}$ of the nuts is less than the width $W_w$ of the web portion so that the nuts can be seated in the channel member. The width $W_{n1}$ of the nuts is greater than the width $W_o$ of the opening so that once seated within the channel member between the inturned flange edges 30 and the web portion 26 the nuts are prevented from falling through the channel member opening. The width $W_{n1}$ of the nuts and the width $W_w$ of the web portion are selected to keep the nuts from rotating unlimitedly on the web portion. Thus, the nuts are self-wrenching.

The height $H_n$ of the nuts is selected to be slightly less than the height $H_f$ of the flange portion to provide clearance between the nuts and the inturned flange edges when the nuts are received in the channel member. That permits a limited amount of movement (linear and rotational) of the nuts between the web portion and the inturned flange edges.

The clearance between the flats of the nuts and the flange portions enables the nuts to have a limited amount of movement (linear and rotational) between the flange portions.

The web portion 26 of the channel member includes a plurality of holes 36 therethrough (FIG. 1) spaced apart by predetermined distances along the length of the channel member. A hole 36 is provided for each nut 24 which is to be retained by the channel member. Associated with each hole 36 is a spaced pair of lances or tabs 38. The lances of a pair of lances are sufficiently spaced apart to receive a nut therebetween with limited longitudinal movement thereof between a pair of lances. Each lance of the pair is spaced from the center of its associated hole so that the nut bore 40 is generally registered with the hole 36.

Other structure for limiting longitudinal displacement of the nuts can be provided, such as, for example, a lance having a single point of attachment to the web rather than the lances 38 illustrated which are attached at both ends to the web, or lances, tabs or crimps extending from the flange portions or the inturned flange edges.

The channel member, the nut and the lances are dimensioned as described above to provide for retention of a nut while permitting three degrees of limited motion. Thus, the nut floats both longitudinally and transversely of the web portion, and floats vertically with respect to the web portion and the inturned flange edges, as well as having limited freedom of rotation with respect to the channel member.

The nuts 24 may be inserted into the channel member 22 through the opening 31 between the inturned flange edges of the channel member. For this purpose, one or both of the opposed flats 42, 43 defining the width of the nut includes an inclined portion adjacent the obverse face 34 of the nut to reduce the overall width $W_{n2}$ of the nut along that face. Described another way, each flat includes a tapered (or beveled or chamfered) portion. While the inclined portion is shown to be planar and disposed to intersect the obverse face 34, the inclined portion can be curved and need not intersect the obverse face 34.

A nut is inserted into the channel member (FIG. 4) between a pair of lances through the opening 31 by pivoting the nut and positioning one flat of the nut, for example flat 43 without the cut-out (whose purpose is described below), in the channel member between the web portion and one inturned flange edge while the opposite flat 42 of the nut (with the cutout) rests with the surface 42A of its inclined portion in the opening 31 and the surface 42B of the full width portion above the inturned flanged edge. Force is then applied to the reverse face 32 of the nut to press it vertically downwardly in the direction of the arrow ("Press", FIG. 4) until the nut clears the inturned flange edge and is seated with both flats of the nut between the web portion and the inturned flange edges.

The material of which the channel member is fabricated and its dimensions are selected so that some elastic flexing of the flange portions can occur. Pressing the nut downwardly into the channel member causes the flange portion to flex outwardly thereby increasing the width of the opening 31 and allowing the nut to pass therethrough. The inclined portion 42A of the nut flat acts as a cam to assist in flexing the flange portion outwardly. The nut can thereby be inserted through the opening 31 in the channel member without the need for special tools and without requiring the application of excessive force.

The nuts 24 may also be removed from the channel member through the opening 31. For that purpose, one or more of the flats 42 of the nut is recessed or cut out in the central region thereof so that the nut flat 42 is defined by two ears 45 and 46 and a cut-out 47. The facing surfaces of the ears and the cut-out adjacent the obverse face of the nut include the inclined portion described above. The facing surfaces of the cut-out could however be straight. The cut-out 47 is made sufficiently deep to provide a slot 48 (FIG. 2) between an inturned flange edge and the cut-out which can receive a flat tool such as a screwdriver for removing the nut as described below. The width of the slot is kept relatively small so as not to detract from the overall strength of the nut at the ears or the nut bore.

To remove a nut from retention or captivation in the channel member, a screwdriver or similar flat-faced tool is inserted into the slot 48 formed by the cut-out 47 between the ears 45, 46 of the nut flat and the inturned flange edge, as shown in broken lines in FIG. 5, and pivoted in the direction of the arrow ("Pivot") to flex the inturned flange edge elastically outwardly while at the same time lifting the nut (shown in full lines) in the direction of the arrow ("Lift") until flat 42 with the cutout clears the inturned flange edge. The inclined portion of the flat facilitates removal of the nut through the opening 31 as well as facilitating its insertion through the opening.

Thus, a nut can be inserted into and removed from the channel member through the opening without a need for special tools and without requiring excessive force.

In order to provide for insertion and removal of a nut through the opening in the channel member without requiring the use of special tools or excessive force and without permanently, i.e., plastically, deforming the flange portions, certain relative dimensions are somewhat critical. Those relative dimensions are the widths $W_{n1}$ and $W_{n2}$ of the nut adjacent the reverse and obverse faces 32 and 34, respectively, of the nut, and the width $W_o$ of the opening 31 between the inturned flange edges. To a certain extent the obtuse angle formed by the inclined portion 42A and the obverse face 34 of the nut is also critical. The relative dimensions also take into consideration the height $H_f$ of the flange portion, the height $H_n$ of the nut and the width $W_w$ of the web portion, although those dimensions are not critical, and also the extent to which the flange portions can flex elastically and the amount of force required to insert and remove a nut.

Referring now to FIG. 4, the range or "envelope" of dimensions is indicated by dotted lines. For inserting the nut, the widths $W_{n1}$, $W_{n2}$ of the nut at the reverse face 32 and the obverse face 34, respectively, must be such that when one flat, for example flat 43, of the nut is positioned in the channel member between the web portion and an inturned flange edge, the inclined portion 42A of the other flat of the nut rests on the upper edge of the opposite inturned flange edge at a point on the inclined portion close to the end thereof, i.e., adjacent the full width portion 42B. If the dimensions be such that the inclined portion of the nut rests on the inturned flange edge close to the obverse face of the nut, then excessive force and a greater flex of the flange portion will be required, neither of which is desirable. On the other hand, if the nut rests on the upper edge of the inturned flange edge too close to the end of or beyond the end of the inclined portion, the nut will slide too easily into the opening and can fall out of captivation in the channel member. With the above description, one skilled in the art can easily determine satisfactory dimensions and tolerances for the nut widths and the width of the opening between the inturned flange edges for any specific embodiment of the invention.

The distance by which the inturned flange edges overlap a fully seated nut and the strength and dimensions of the channel member determine the push-out force for the nut and are selected accordingly.

The material of which the channel member is fabricated and the dimensions of the member depend on the particular application to which the nut retainer is to be put. Where the nut retainer is intended to be used primarily as a nut retainer and not significantly as a structural member to distribute forces along the length of the web portion of the channel member, the channel member can be made relatively thin and of lightweight material such as aluminum or plastic, for example. Where it is intended that the channel member in addition to retaining the nuts also provide a substantial force-distributing function, then the dimensions of the channel member can be altered to provide an increased cross section moment of inertia and/or the channel member can be made of a more rigid material such as steel.

Referring next to FIGS. 6 and 7, the bolt retainer 50 comprises a channel member 22 which can be identical to the channel member 22 of the nut retainer 20, and a retainer 52 for the bolts 53. The dimensions of the channel member and the outside dimensions of the retainer 52 of the bolt retainer 50 can be identical to corresponding dimensions of the channel member and the outside dimensions of the nut 24 of the retainer 20, with corresponding dimensions being somewhat critical within parameters described above. Accordingly, the retainer 52 can be inserted and removed through the opening between the inturned flange edges as described for the nut 24 of the retainer 20.

The retainer 52 includes a bore 54 in which is disposed an annular washer 56 of resilient material such as natural or synthetic rubber. The washer is dimensioned so as to be force-fitted in the bore of the retainer 52 and includes an outwardly flanged portion 58 which corresponds to a radiused portion 59 of the bore at the obverse face of the retainer. The diameter of the retainer bore is larger than the diameter of the bolt thread of the bolt shank which is to be retained, while the inside diameter of the washer is somewhat less than the thread diameter so as to provide a frictional fit of the bolt shank in the washer. Preferably, the washer is structured so that a bolt shank can be inserted rather easily into the retainer but is more difficult to remove. Since the washer is resilient, some relative pivoting motion will be possible between the retainer and the bolt. Retainers of the type described, so far as the bore and the washer are concerned, are well known to those of skill in the art.

The retainer 52 has the same degrees of limited motion as described for the nut 24 in the retainer 20 of FIG. 2. Thus, once a bolt is inserted in and retained by the retainer 52 the bolt has the degrees of freedom described for the nut 24.

The head of the bolt is conventional with the distance between flats being appreciably larger than the diameter of the retainer bore 54.

The retainer 52 and the bolt can in an alternative embodiment be provided as an integral unit in which the retainer forms the head of the bolt. In such an embodiment, while the bolt will enjoy the same limited movement as in the embodiment of a bolt with a separate retainer, the bolt can only be removed from the channel member as a unit with its integral retainer head. This may require an enlargement of hole 36 to accomodate the pivoting of the bolt which is necessary to remove the retainer head from the channel member.

As indicated above, nut retainer 20 can be used for blind fastening applications and the bolt retainer 50 can be used for blind fastening applications as well. Also, the nut retainer 20 and the bolt retainer 50 can be used independently of each other or can be used as a complementary fastening or clamping system.

A complementary fastening system which facilitates clamping of two objects together is illustrated in FIG. 8. The complementary fastening system 60 includes a nut retainer 20 and a bolt retainer 50 disposed along the exposed surfaces of the two objects 61, 62 with the bolts extending through registered holes of the objects and threaded to respective nuts to clamp the objects together. With the complementary clamping system 60 of FIG. 8, both the nuts and the bolts of the respective assemblies are captivated with limited degrees of freedom. This greatly simplifies a clamping procedure while reducing the occurrence of cross-threading. Should a nut and/or a bolt have to be removed because of cross-threading or galling, the nut and bolt are unthreaded, and the bolt simply withdrawn from the retainer, and/or the nut removed from the channel member as described above without having to unthread other nuts and bolts or remove either channel member from the objects. Should a nut and bolt become seized, further torque is applied to the bolt until the bolt shears. Then the sheared bolt with its head can be withdrawn from the retainer, and the nut 24 with the sheared shank of the bolt can be removed from the channel member as described above, both without having to remove either channel member from the objects.

It is within the contemplation of the invention that the channel member can take different configurations. One configuration of a channel member is illustrated in FIGS. 1-8. Another configuration is illustrated in FIGS. 9-13.

The channel member 22' depicted in FIGS. 9-13 includes a web portion 26' and two spaced flange portions 28' extending from a given side of the web portion 26'. Each of the flange portions 28' includes an edge portion generally designated 30' not only turned in towards the opposite flange portion but also generally reversed on itself. The inturned flange edges 30' thus include a portion 70 (FIG. 11) turned in from the flange portion 28' towards the opposite flange portion and a downwardly depending leg portion 71 extending from the portion 70 towards the web portion 26'. The portions 70 and 71 are turned in along a curve or curves, as shown, generally as a U-bend or reverse or hairpin turn, but could, if desired, be turned in at a sharp angle or angles, for example, square corners, or in a combination or mixture of turns which includes a curve or curves and a sharp angle or angles. While the flange portions 28' are illustrated as extending from the web portion at right angles and the flange portions 70 and 71 are illustrated as extending from an adjacent flange portion generally at right angles (whether the turn is curved or sharp), it is within the contemplation of the invention that the respective flange portions can extend at angles other than right angles.

As shown in FIG. 10, the flange portions 71 are spaced apart to define an opening 31' having a width $W_o$; the web portion between the flange portions 28' has a width designated $W_w$; and the flange portions 71 define a flange height $H_f$ from the top of the web portion to the bottom of the respective flange portion 71.

The relative dimensions of the channel member 22' and the nut 24 are generally as described for the embodiment of FIGS. 1–5, recognizing that the height $H_f$ in the channel member is from the web portion 26' to the bottom of flange portion 71 and the width $W_o$ of the opening 31' extends between the inside surfaces of flange portions 71. Thus, similar to the embodiment of FIGS. 1–5, the height $H_n$ of the nuts is less than the height $H_f$ of the flange portion 71 and the width $W_{n1}$ of the nuts is greater than the width $W_o$ of the opening so that once seated within the channel member between the inturned flange edges 30' (i.e., the flange portions 71) and the web portion 26' the nuts are prevented from falling through the channel member opening; the width $W_{n1}$ of the nuts and the width $W_w$ of the web portion are selected to keep the nuts from rotating unlimitedly on the web portion; the height $H_n$ of the nuts is selected to be slightly less than the flange portion height $H_f$ to provide clearance between the nuts and the flange inturned edges (flange portions 71) when the nuts are received in the channel member, thereby permitting a limited amount of movement (linear and rotational) of the nuts between the web portion and the inturned flanged edges; and the clearance between the flats of the nuts and the flange portions enables the nuts to have a limited amount of movement (linear and rotational) between the flange portions.

The channel member 22' and the nut 24 are dimensioned as described above and the lances as described with respect to FIGS. 1-5 to provide for retention of a nut while permitting three degrees of limited motion, as in the embodiment of FIGS. 1-5.

A nut 24 is inserted into the channel member 22' and removed from the channel member 22' generally as described for channel 22 except that during insertion the inclined portion 42A of the nut rests generally on the flange portion 71 while the straight portion 42B is disposed above the flange portion 71 resting generally on the flange portion 70 (FIG. 12) and during removal either on both flange portion 71 and flange portion 28' are flexed by the screwdriver (FIG. 13).

In order to provide for insertion and removal of a nut through the opening 31' in the channel member 22' without requiring the use of special tools or excessive force and without permanently, i.e., plastically, deforming the flange portions, certain relative dimensions are somewhat critical. Those relative dimensions are generally as described for the embodiment of FIGS. 1-5 and the range or "envelope" of dimensions for the nut is indicated by dotted lines in FIG. 12.

The height of the flange portion 28', as compared with the flange portion 28 of the channel member 22, is relatively high for the same flange portion height $H_f$. The additional height of the flange portion 28' provides greater longitudinal stiffness to the channel member 22'.

The channel member 22' can also be used with the retainer 50 or an integral retainer/bolt as described above to provide a bolt retainer assembly. Moreover, the channel member 22' can be used as the channel member in one or both of the retainer assemblies in a complimentary fastening system, as described above.

While retainer assemblies including linear channel members have been illustrated, the invention is equally applicable to retainer assemblies including curved channel members.

Protection by Letters Patent of this invention in all its aspects as the same are set forth in the appended claims is sought to the full extent that the prior art allows.

What is claimed is:

1. A fastener assembly comprising a channel member having a web portion and two spaced flange portions extending from a same side of the web portion, each of the flange portions including an edge turned in towards the other flange portion, the inturned flange edges being spaced apart to define an opening therebetween into the channel member, at least one fastener having opposed spaced apart faces and a pair of opposed side surfaces extending between the opposed faces defining a base which is disposed in the channel member between the web portion and the inturned flange edges thereof, the channel member and the fastener base being configured and sized so that the fastener base when disposed in the channel member between the web portion and the inturned flange edges of the channel member is captivated therein while having limited movement relative to the channel member, configuration associated with the fastener base for facilitating insertion of the base into the channel member through the opening comprising an inclination of at least a portion of at least one of the side surfaces at an obtuse angle with the face of the fastener base facing the web portion when the base is disposed in the channel member such that the distance between side surfaces along said one face of the fastener base facing the web portion is less than the corresponding distance along the other face of the fastener base, said distances along opposed faces and said opening being selected so that the fastener base can be inserted into the channel member with a side surface thereof disposed between one inturned flange edge and the web portion of the channel member and the inclined portion of the opposed side surface resting on the opposed inturned flange edge, the rigidity of the flange portions, said opening and said distances along the fastener faces being further selected so that the fastener base can be inserted into the channel member through said opening to seat both side surfaces disposed below respective inturned flange edges upon the application of a predetermined relatively small force which flexes elastically at least one of the flange portions, and configuration associated with the fastener base for facilitating removal of the base from the channel member through the opening.

2. The fastener assembly according to claim 1 wherein the inclined portion of the side surface is planar and intersects said one face of the base which faces the web portion at the obtuse angle.

3. The fastener assembly according to claim 2 wherein the side surface having the inclined portion includes a portion intersecting the other face of the base at approximately a right angle.

4. The fastener assembly according to claim 1 wherein said configuration for facilitating removal is adapted to receive the tip of a lever-like object by means of which the fastener base can be pivoted.

5. The fastener assembly according to claim 4 wherein said configuration comprises a recessed portion in at least one of the side surfaces of the base, the depth and the extent of the recessed portion cooperating with an inturned flange edge to define a slot adapted to receive said tip when the base is disposed in the channel member.

6. The fastener assembly according to claim 5 wherein the recessed portion is centrally disposed in the side surface, that surface including a projecting portion on each side of the recessed portion.

7. The fastener assembly according to claim 1 wherein the fastener is a nut having a threaded bore, said web portion having a hole therein which generally registers with the threaded bore when the nut is disposed in the channel member.

8. The fastener assembly according to claim 1 wherein the fastener is a retainer for a bolt having a bore which frictionally engages the shank of the bolt, said web portion having a hole therein which generally registers with the bore when the retainer is disposed in the channel member.

9. The fastener assembly according to claim 1 wherein the flange portions extend from the web portion at approximately a right angle and the inturned flange edges form an approximate right angle with the remainder of the respective flange portion.

10. The fastener assembly according to claim 1 wherein the flange portions extend from the web portion at approximately a right angle and each inturned flange edge is generally reversed on itself and includes a depending leg portion.

11. In a fastener assembly comprising a channel member having a web portion and two spaced flange portions extending from a same side of the web portion, each of the flange portions including an edge turned in towards the other flange portion, the inturned flange edges being spaced apart to define an opening therebetween into the channel member, at least one fastener having opposed spaced apart faces and a pair of opposed side surfaces extending between the opposed faces defining a base disposed in the channel member between the web portion and the inturned flange edges thereof, the channel member and the opposed faces of the fastener base being configured and sized so that the fastener base when disposed in the channel member between the web portion and the inturned flange edges of the channel member is captivated therein while having limited movement relative to the channel member; the improvement comprising configuration associated with the fastener base for facilitating insertion of the base into the channel member through the opening and configuration associated with the fastener base for facilitating removal of the base from the channel member through the opening, said configuration facilitating insertion of the base into the channel member including an inclination of at least a portion of at least one of the side surfaces at an obtuse angle with the face of the fastener base facing the web portion when the base is disposed in the channel member such that the distance between side surfaces along said one face of the fastener base facing the web portion is less than the corresponding distance along the other face of the fastener base, said distances along opposed faces and said opening being selected so that the fastener base can be inserted into the channel member with a side surface thereof disposed between an inturned flange edge and the web portion of the channel member and the inclined portion of the opposed side surface resting on the opposed inturned flange edge, the rigidity of the flange portions, said opening and said distances along the fastener faces being selected so that the fastener base can be inserted into the channel member through said opening to seat both side surfaces disposed below respective inturned flange edges upon the application of a predetermined relatively small force which flexes elastically at least one of the flange portions.

12. In the fastener assembly according to claim 11, the improvement comprising the inclined portion of the side surface being planar and intersecting said one face of the base which faces the web portion at the obtuse angle.

13. In the fastener assembly according to claim 12, the improvement comprising the side surface having the inclined portion including a portion intersecting the other face of the base at approximately a right angle.

14. In the fastener assembly according to claim 11, the improvement comprising said configuration for facilitating removal is adapted to receive the tip of a lever-like object by means of which the fastener base can be pivoted.

15. In the fastener assembly according to claim 14, the improvement comprising said configuration comprising a recessed portion in at least one of the side surfaces of the base, the depth and the extent of the recessed portion cooperating with an inturned flange edge to define a slot adapted to receive said tip when the base is disposed in the channel member.

16. In the fastener assembly according to claim 15, the improvement comprising the recessed portion being centrally disposed in the side surface, that surface including projecting portion on each side of the recessed portion.

17. In the fastener assembly according to claim 11, the improvement comprising the fastener being a nut having a threaded bore, said web portion having a hole therein which generally registers with the threaded bore when the nut is disposed in the channel member.

18. In the fastener assembly according to claim 11, the improvement comprising the fastener being a retainer for a bolt having a bore which frictionally engages the shank of the bolt, said web portion having a hole therein which generally registers with the bore when the retainer is disposed in the channel member.

19. A fastener adapted to be captivated in a channel member having a web portion and two spaced flange portions extending from a same side of the web portion, each of the flange portions including an edge turned in towards the other flange portion, the inturned flange edges being spaced apart to define an opening therebetween into the channel member, said fastener comprising opposed spaced apart faces and a pair of opposed side surfaces extending between the opposed faces defining a base, the fastener base being sized and configured so that the fastener base when disposed in the channel member between the web portion and the inturned flange edges of the channel member is captivated therein while having limited movement relative to the channel member, the fastener base including configuration for facilitating insertion of the base into the channel member through the opening and configuration for facilitating removal of the base from the channel member through the opening, said configuration for facilitating insertion of the base into the channel member comprising an inclination of at least a portion of at least one of the side surfaces at an obtuse angle with the face of the fastener base facing the web portion when the base is disposed in the channel member such that the distance between side surfaces along said one face of the fastener base facing the web portion is less than the corresponding distance along the other face of the fastener base, said distances along opposed faces being selected so that the fastener base can be inserted through the opening into the channel member with a side surface thereof disposed between one inturned flange edge and the web portion of the channel member and the inclined portion of the opposed side surface resting on the opposed inturned flange edge, the distances along the fastener faces being further selected so that the fastener base can be inserted into the channel member through said opening to seat both side surfaces disposed below respective inturned flange edges upon the application of a predetermined relatively small force adapted to flex elastically at least one of the flange portions.

20. The fastener according to claim 19 wherein the inclined portion of the side surface is planar and intersects said one face of the base which is adapted to face the web portion at the obtuse angle.

21. The fastener according to claim 20 wherein the side surface having the inclined portion includes a portion intersecting the other face of the base at approximately a right angle.

22. The fastener according to claim 19 wherein said configuration for facilitating removal is adapted to receive the tip of a lever-like object by means of which the fastener base can be pivoted.

23. The fastener according to claim 22 wherein said configuration comprises a recessed portion in at least one of the side surfaces of the base, the depth and the extent of the recessed portion cooperating with an inturned flange edge to define a slot adapted to receive said tip when the base is disposed in the channel member.

24. The fastener according to claim 23 wherein the recessed portion is centrally disposed in the side surface, that surface including a projecting portion on each side of the recessed portion.

25. The fastener according to claim 19 wherein the fastener is a nut having a threaded bore adapted to register with a hole in the web portion of the channel member when the nut is disposed in the channel member.

26. The fastener according to claim 19 wherein the fastener is a retainer for a bolt having a bore which frictionaly engages the shank of the bolt and which is adapted to register with a hole in the web portion of the channel member when the retainer is disposed in the channel member.

27. A clamping system for clamping two adjacently disposed objects together comprising a pair of complementary fastener assemblies, each assembly adapted to be disposed at a surface of a respective object in an opposing relationship and comprising:
 a channel member having a web portion and two spaced flange portions extending from a same side of the web portion, each of the flange portions including an edge turned in towards the other flange portion, the inturned flange edges being spaced apart to define an opening therebetween into the channel member,
 at least one fastener having opposed spaced apart faces and a pair of opposed side surfaces extending between the opposed faces defining a base which is disposed in the channel member between the web portion and the inturned flanged edges thereof, the channel member and the fastener base being configured and sized so that the fastener base when disposed in the channel member between the web portion and the inturned flange edges of the channel member is captivated therein while having limited movement relative the channel member,
 configuration associated with the fastener base for facilitating insertion of the base into the channel member through the opening comprising an inclination of at least a portion of at least one of the side surfaces at an obtuse angle with the face of the fastener base facing the web portion when the base is disposed in the respective channel member such that the distance between side surfaces along said one face of the fastener base facing the web portion is less than the corresponding distance along the other face of the fastener base, said distances along opposed faces and said opening being selected so that the fastener base can be inserted into the channel member with a side surface thereof disposed between one inturned flange edge and the web portion of the channel member and the inclined portion of the opposed side surface resting on the opposed inturned flange edge, the rigidity of the flange portions, said opening and said distances along the fastener faces being further selected so that the fastener base can be inserted into the respective channel member through said opening to seat both side surfaces disposed below respective inturned flange edges upon the application of a predetermined relatively small force which flexes elastically at least one of the flange portions, and
 configuration associated with the fastener base for facilitating removal of the base from the channel member through the opening,
 the fasteners of the pair of assemblies being complementary and means adjustably engaging respective complementary fasteners passing through the channel members to thereby clamp the two adjacently disposed objects together.

28. The clamping system according to claim 27 wherein for each of the complimentary fastener assemblies, the inclined portion of the side surface is planar and intersects said one face of the base which faces the web portion at the obtuse angle.

29. The clamping system according to claim 28 wherein for each of the complimentary fastener assemblies, the side surface having the inclined portion of each fastener base includes a portion intersecting the other face of the base at approximately a right angle.

30. The clamping system according to claim 27 wherein for each of the complimentary fastener assemblies, said configuration for facilitating removal is adapted to receive the tip of a lever-like object by means of which the fastener base can be pivoted.

31. The clamping system according to claim 30 wherein for each of the complimentary fastener assemblies, said configuration comprises a recessed portion in at least one side surface of each fastener base, the depth and the extent of the recessed portion cooperating with an inturned flange edge of the respective channel member to define a slot adapted to receive said tip when the base is disposed in the respective channel member.

32. The clamping system according to claim 31 wherein for each of the complimentary fastener assemblies, the recessed portion of the base of each fastener is centrally disposed in the side surface, that surface including a projecting portion on each side of the recessed portion.

33. The clamping system according to claim 27 wherein the fastener of one fastener assembly is a nut having a threaded bore, said web portion of the channel member of that fastener assembly having a hole therein which generally registers with the threaded bore of the nut when the nut is disposed in the channel member.

34. The clamping system according to claim 33 wherein the fastener of the other fastener assembly is a retainer for a bolt having a bore which frictionally engages the shank of the bolt, said web portion of the channel member of the other fastener assembly having a hole therein which generally registers with the bore of the retainer when the retainer is disposed in the channel member.

* * * * *